(12) United States Patent
Webster

(10) Patent No.: US 8,205,434 B2  
(45) Date of Patent: Jun. 26, 2012

(54) JOINT FOR A SHAPE MEMORY MATERIAL

(75) Inventor: John R. Webster, Derby (GB)

(73) Assignee: Rolls-Royce, PLC, London (GB)

( * ) Notice: Subject to any disclaimer, the term of this patent is extended or adjusted under 35 U.S.C. 154(b) by 1092 days.

(21) Appl. No.: 12/078,633

(22) Filed: Apr. 2, 2008

(65) Prior Publication Data

US 2008/0256957 A1 Oct. 23, 2008

(30) Foreign Application Priority Data

Apr. 23, 2007 (GB) .................................. 0707756.3

(51) Int. Cl.
- *F02K 1/38* (2006.01)
- *F02K 1/46* (2006.01)
- *F02K 3/02* (2006.01)

(52) U.S. Cl. ............. 60/262; 60/263; 60/771; 60/770; 239/265.39; 239/265.33; 239/265.43; 239/265.19

(58) Field of Classification Search .................. 60/262, 60/263, 771, 770; 239/265.33, 265.43, 265.19, 239/265.39

See application file for complete search history.

(56) References Cited

U.S. PATENT DOCUMENTS

| | | | |
|---|---|---|---|
| 6,089,781 A | 7/2000 | Kellberg | |
| 6,326,089 B1* | 12/2001 | Claxton | 428/615 |
| 7,578,132 B2* | 8/2009 | Webster | 60/770 |
| 2005/0172462 A1* | 8/2005 | Rudduck et al. | 24/606 |
| 2008/0181763 A1* | 7/2008 | Webster et al. | 415/9 |

FOREIGN PATENT DOCUMENTS

| | | |
|---|---|---|
| EP | 1 612 416 A1 | 1/2006 |
| GB | 2 393 927 A | 4/2004 |
| WO | WO 2005/047714 A1 | 5/2005 |

OTHER PUBLICATIONS

European Search Report issued in European Application No. 08 25 1150 on Nov. 12, 2009.

* cited by examiner

*Primary Examiner* — Louis Casaregola  
*Assistant Examiner* — Craig Kim  
(74) *Attorney, Agent, or Firm* — Oliff & Berridge, PLC

(57) ABSTRACT

A joint including a first component and a second component. The second component including a shape memory material component. The first component has a half dovetail shaped slot and the shape memory material second component has a half dovetail shaped attachment feature disposed in the half dovetail shaped slot in the first component.

15 Claims, 3 Drawing Sheets

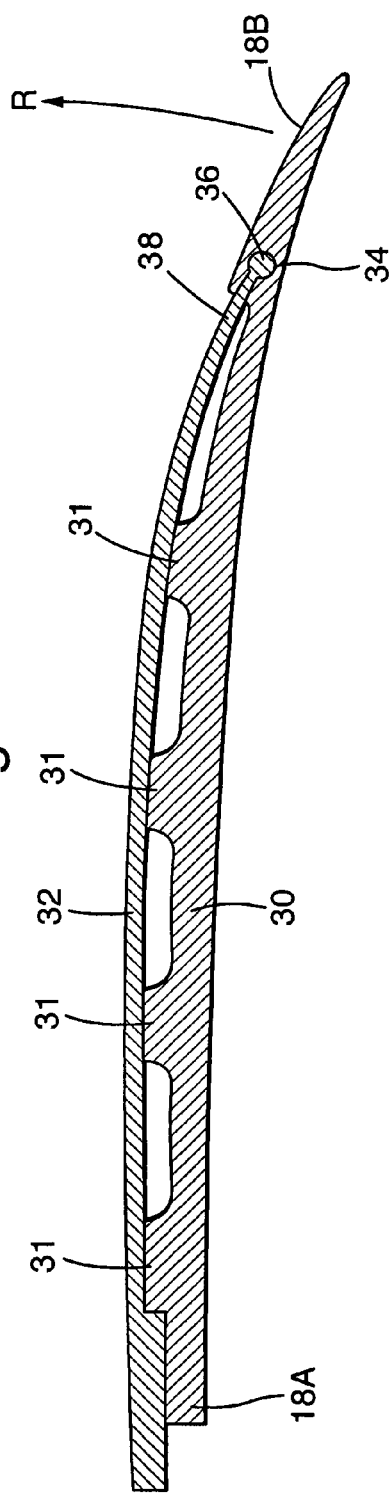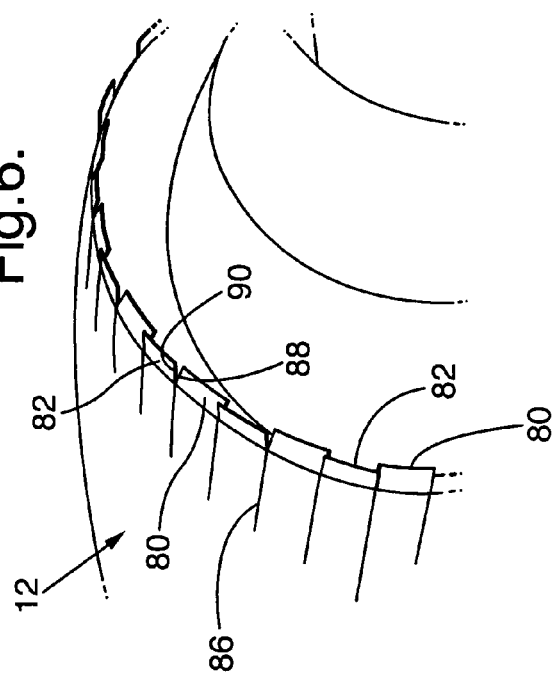

JOINT FOR A SHAPE MEMORY MATERIAL

BACKGROUND

The present invention relates to a joint for a shape memory material and in particular to a joint between a shape memory material component and another component, more particularly to a joint between a shape memory alloy component and another component.

Shape memory alloys have previously been limited to small section components and relatively fragile components.

There is a requirement for large, high integrity, components with embedded shape memory alloy actuators. Large, high integrity, components comprising parent alloys components/structures and shape memory alloy actuators/components are required and these must be joined under high loading.

The joining of shape memory alloy components, particularly NiTi shape memory alloys, to other components is notoriously difficult with most applications using mechanical joints. The use of welded joints has been investigated but an acceptable solution has not been found. Welded joints are not practical, acceptable, because brittle intermetallics are formed.

SUMMARY

Accordingly the present invention seeks to provide a novel joint between a shape memory material component and another component, which reduces, preferably overcomes, the above-mentioned problem.

Accordingly the present invention provides a joint between a first component and a second component, the second component comprising a shape memory material component, the first component having a half dovetail shaped slot, the shape memory material second component having a half dovetail shaped attachment feature and the half dovetail shaped attachment feature of the shape memory material second component locating in the half dovetail shaped slot in the first component.

Preferably the second shape memory material includes a shape memory alloy.

Preferably the second shape memory material includes a NiTi alloy.

Preferably the first component includes a metal or an alloy.

Preferably the first component includes a Ti alloy.

Preferably the first component and the second component constitute a tab, the tab extending in a downstream direction from a downstream end of a gas turbine exhaust nozzle, the second component comprising an actuator to move the tab between a second non-deployed position and a first deployed position.

The exhaust nozzle may be a fan exhaust nozzle or a core exhaust nozzle.

Preferably the first component is joined to the second component at the downstream end of the tab.

Preferably there are heating means to heat the second component such that the second component moves the first component between the second non-deployed position and the first deployed position.

BRIEF DESCRIPTION OF THE DRAWINGS

The present invention will be more fully described by way of example with reference to the accompanying drawings in which:

FIG. 3 is an enlarged cross-sectional view of a noise reducing tab comprising components joined according to the present invention.

FIG. 6 is an enlarged perspective view of an alternative exhaust nozzle having noise reducing tables comprising components joined according to the present invention.

DETAILED DESCRIPTION OF EMBODIMENTS

Figure 1:
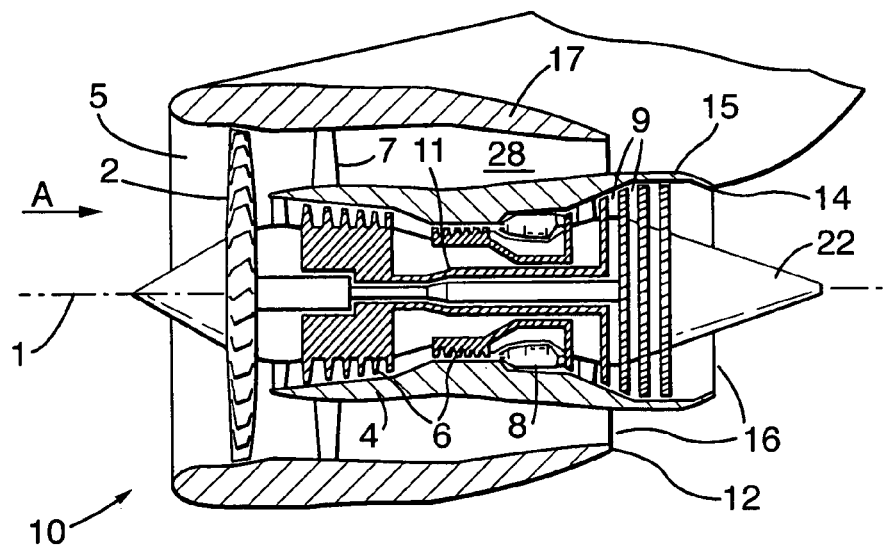
FIG. 1 shows a turbofan gas turbine engine having an exhaust nozzle having noise reducing tabs comprising components joined according to the present invention.

A turbofan gas turbine engine 10, as shown in FIG. 1, includes in axial flow series an air intake 5, a propulsive fan 2, a core engine 4 and an exhaust nozzle assembly 16 all disposed about an engine axis 1. The core engine 4 includes in axial flow series a series of compressors 6, a combustor 8 and a series of turbines 9. The direction of airflow through the turbofan gas turbine engine 10 in operation is indicated by arrow A and the terms upstream and downstream are used with reference to this general flow direction. Air is drawn through the air intake 5 and is compressed by the fan 2. The airflow from the fan 2 is split between a flow through the core engine 4 and a bypass flow. The flow through the core engine 4 flows through the compressors 6 where it is further compressed and into the combustor 8 where it is mixed with fuel and the fuel is burnt in the air in the combustor 8. The combustion of the fuel in the compressed air in the combustor 8 produces hot gases, which exit the combustor 8 and flow downstream through and drive the turbines 9. The turbines 9 drive the compressors 6 and fan 2 via shafts 11 which drivingly connect the turbines 9 with the compressors 6 and the fan 2.

The exhaust gases leaving the turbine 9 flow through the exhaust nozzle assembly 16 to provide propulsive thrust. The remainder of the air from the fan 2, the bypass flow, flows within a bypass duct 7 around the core engine 4. The bypass flow, which has been accelerated by the fan 2 also flows to the exhaust nozzle assembly 16 where it is exhausted, as a bypass exhaust stream to provide further, the majority of the, propulsive thrust.

The velocity of the bypass exhaust stream is significantly lower than the velocity of the core engine exhaust stream. Turbulent mixing of the bypass exhaust stream and the core engine exhaust stream occurs in the region of, and downstream of, the exhaust nozzle assembly 16. These two exhaust streams also mix with the ambient air surrounding and downstream of the exhaust nozzle assembly 16. This mixing of the two exhaust streams and the ambient air produces noise.

The exhaust nozzle assembly 16 includes two concentric exhaust nozzles, a radially outer bypass exhaust nozzle 12 and a radially inner core exhaust nozzle 14. The core exhaust nozzle 14 is defined at its radially outer extent by a generally frusto-conical core nozzle wall 15 and at its radially inner extent by a frusto-conical engine plug structure 22. The bypass exhaust nozzle 12 is defined its radially outer extent by a nacelle 17 and at its radially inner extent by the nozzle wall 15.

Figure 2:
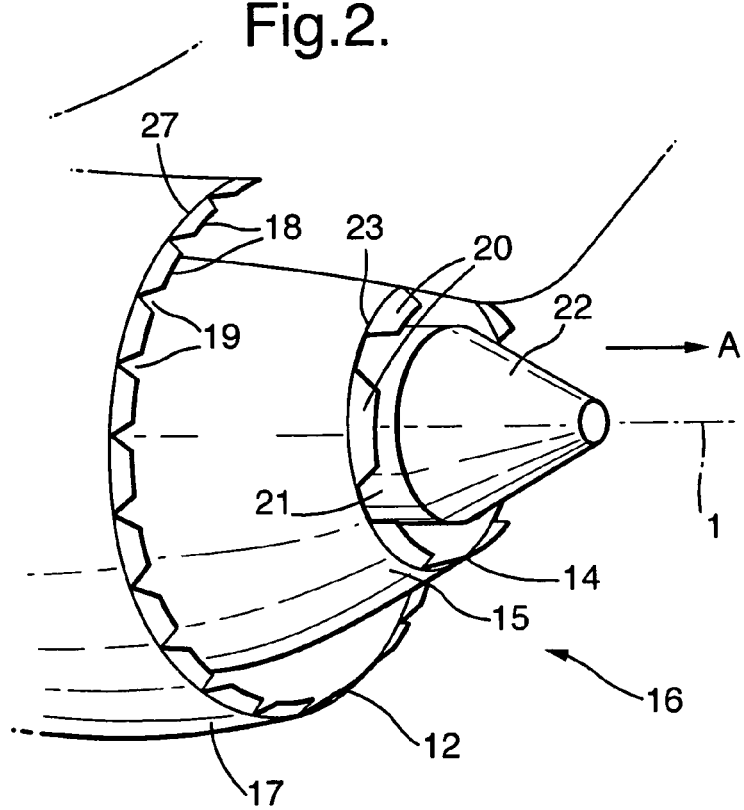
FIG. 2 is an enlarged perspective view of the exhaust nozzle having noise reducing tabs comprising components joined according to the present invention.

The exhaust nozzle assembly 16 is shown more clearly in FIG. 2 and it includes noise reduction means comprising a number of tabs. A plurality of circumferentially spaced tabs 20 extend from the downstream end of the core exhaust nozzle 14 and in particular from the downstream end of the frusto-conical core nozzle wall 15. As shown the tabs 20 are of trapezoidal shape with the sides of the tabs 20 circumferentially tapering away from each other in a downstream direction to form a plurality of circumferentially disposed notches, or spaces, 21 defined between adjacent tabs 20. The notches 21 are complementary to the shape of the tabs 20 and are of trapezoidal shape with the notches 21 increasing in dimension in a downstream direction. The tabs 20 and notches 21 are evenly circumferentially spaced.

Similarly a plurality of circumferentially spaced tabs 18 extend from the downstream end of the bypass exhaust nozzle 12 and in particular from the downstream end of the nacelle 17. As shown the tabs 18 are of trapezoidal shape with the sides of the tabs 18 circumferentially tapering away from each other in a downstream direction to form a plurality of circumferentially disposed notches, or spaces, 19 defined between adjacent tabs 18. The notches 19 are complementary to the shape of the tabs 18 and are of trapezoidal shape with the notches 19 increasing in dimension in a downstream direction. The tabs 18 and notches 19 are evenly circumferentially spaced.

Figure 4:
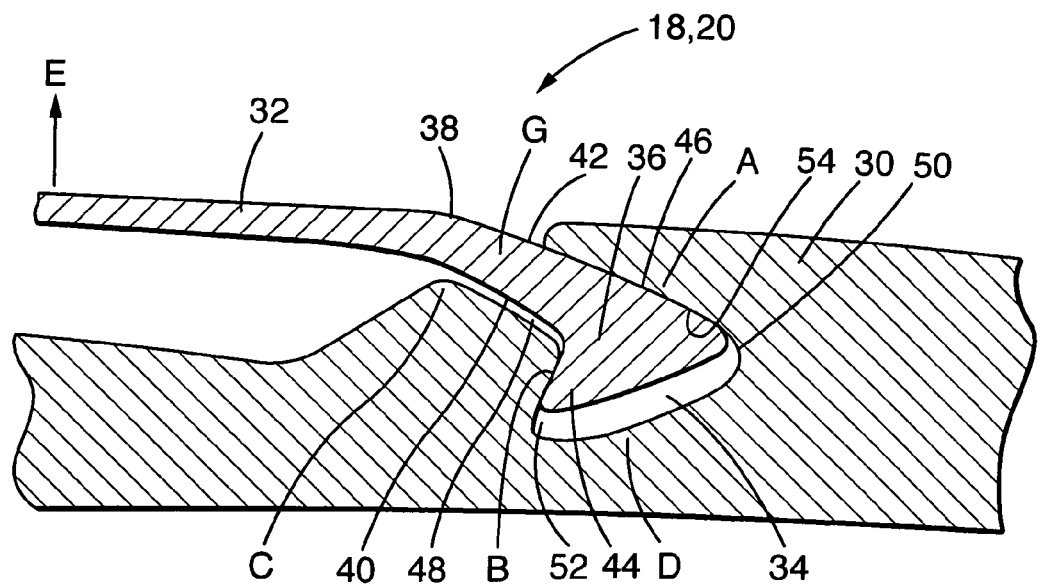
FIG. 4 is a further enlarged cross-sectional view of the joint between the components of the tab shown in FIG. 3.

The tabs 18, 20, as shown in FIGS. 3 and 4, comprise a first component 30 and a second component 32. The second component 32 includes a shape memory material component. The first component 30 has a half dovetail shaped slot 34 and the shape memory material second component 32 has a half dovetail shaped attachment feature 36 and the half dovetail shaped attachment feature 36 of the shape memory material second component 32 locates in the half dovetail shaped slot 34 in the first component 30. The second shape memory material includes a shape memory alloy, and for example the second shape memory material includes a nickel-titanium, NiTi, alloy. The first component 30 includes a metal or an alloy, for example the first component 30 includes a titanium, Ti, alloy.

The first component 30 and the second component 32 together constitute a tab 18, 20 and the tab 18, 20 extends in a downstream direction from a downstream end of a gas turbine exhaust nozzle, the fan, or bypass, exhaust nozzle 12 or the core exhaust nozzle 14. The second component 32 includes an actuator to move the tab 18, 20 between a second non-deployed position and a first deployed position.

The first component 30 is joined to the second component 32 at the downstream end 18B of the tab 18, 20. There are heating means to heat the second component 32 such that the second component 32 moves the first component 30 between the second non-deployed position and the first deployed position. The heating means may comprise electrical or other suitable heaters. The first component 30 is also joined to the second component 32 at axially spaced positions 31 by screws, bolts or rivets.

The half dovetail attachment feature 36 is provided at a first end 38 of the second component 32 and the half dovetail attachment feature 36 includes a projection 44 extending from a first side 40 of the half dovetail attachment feature 36 and a flat surface 46 on a second side 42 of the half dovetail attachment feature 36. The half dovetail slot 34 includes a recess 52 extending from a first side 48 of the half dovetail slot 34 and a flat surface 54 on a second side 50 of the half dovetail slot 34. The projection 44 on the half dovetail attachment feature 36 locates in the recess 52.

Point A of the joint between the half dovetail slot 34 in the first component 30 and the half dovetail attachment feature 36 of the shape memory material second component 32 is arranged such that the flat surface 46 on the second side 42 of the second component 32 and the flat surface 54 on the second side 50 of the first component 30 are substantially free to slide relative to each other, to significantly reduce the bending stresses at point D in the first component 30 and allow a thinner section at point D and hence allow a thinner section of the first component 30.

Point B of the joint is the point where the first side 48 of the half dovetail slot 34 in the first component 30 takes most of the load from the projection 44 on the first side 40 of the half dovetail attachment feature 36 of the shape memory material second component 32. The load is transferred directly by abutment from the projection 44 of the half dovetail attachment feature 36 of the second component 32 to the first side 48 of the half dovetail slot 34 in the first component 30.

Point C of the joint is the point where the first side 48 of the half dovetail slot 34 in the first component 30 is arranged such that under all load conditions, especially when point E on the shape memory material second component 32 moves upwards in FIG. 3, it has a positive closing load.

The half dovetail attachment feature 36 shape memory material second component 32 is arranged to have a smooth transition between points F and G to minimise stresses during operation. The net effect is a smooth, thin, method of joining a shape memory material second component 32 to a first component 30 and converting tension and varying angles in the shape memory material second component 32 into bending in the first component 30.

In use each tab 18, 20 is positioned such that the shape memory material second component 32 is positioned radially within the first component 30. The shape memory material second components 32 are heated in operation to cause the shape memory material components 32 to change shape and each shape memory material second component 32 applies a tensile force on the first component 30 of the respective tab 18. The tensile force applied by the shape memory material second component 32 causes the first component 30 of the respective tab 18 to bend such that the downstream end 18B of the respective tab 18 moves substantially radially inwards to the deployed position as shown by arrow R in FIG. 3. When the shape memory material second components 32 are not heated the first component 30 of the respective tab 18 returns to its original position and the downstream end 18B of the tab 18 moves substantially radially outwards to the non-deployed position shown in FIG. 3.

Figure 5:
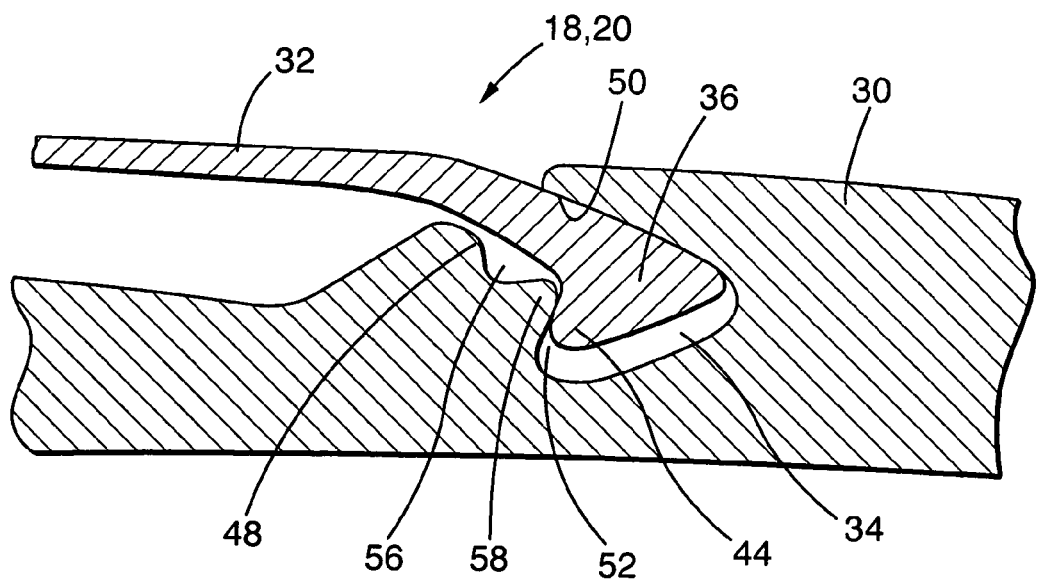
FIG. 5 is a further enlarged alternative cross-sectional view of the joint between the components of the tab shown in FIG. 3.

A further variation of the joint is shown in FIG. 5, and this differs in that the first side 48 of the half dovetail slot 34 in the first component 30 also has a second recess 56 to define a lip 58 between the recess 52 and the second recess 56. This lip 58 is intentionally weakened by the second recess 56 to provide controlled bending of the lip 58 to reduce the interface loads between the projection 44 on the first side 42 on the half dovetail attachment feature 36 on the second component 32 and the first side 48 on the half dovetail slot 34 in the first component 30.

Although the present invention has been described with reference to the shape memory material second component being positioned radially within the first component and to move the first component from a non-deployed position to a deployed position to change the shape of a tab, it may be equally possible for the shape memory material second component to be positioned radially outside the first component and to move the first component from a non-deployed position to a deployed position to change the shape of a tab or other member.

In these circumstances, as shown in FIG. 6 there are two sets of tabs 80 and 82. The tabs 80 are rigidly fixed in a deployed position and the tabs 82 comprise a first component 30 and a shape memory material second component 32. The tabs 82 are movable between a deployed position as shown in FIG. 6 and a non-deployed position, where they are circumferentially aligned with tabs 80. At take off and climb the tabs 82 are deployed for noise reduction and the exit area of the nozzle is enlarged. The enlargement reduces the velocity of the gas stream and intrinsically reduces noise. At cruise the tabs 82 are in the non-deployed position and the edges 88, 90 of the tabs 80 and 82 are in sealing engagement with one another, and the exit area of the nozzle is reduced. The reduction in the exit area of the nozzle increases the velocity of the exhaust gas stream and improves efficiency. The shape memory material second component 32 is positioned radially outside the first component 30 and moves the first component 30 from a non-deployed position to a deployed position to change the shape of the tab 82.

Although the present invention has been described with reference to a NiTi shape memory alloy it is equally applicable to other shape memory alloys.

The advantage of the present invention is that it allows a shape memory material component to be joined to another component with a mechanical joint and not a metallurgical joint. The joint is thin. The joint minimises stresses in both the components.

The half dovetail joint provides a method of fixing and maintaining a more favorable stress condition on the shape memory material second component, which might otherwise undergo excessive strain when in an easily deformed, cold, condition.

I claim:

1. A joint comprising:
   a first component having a half dovetail shaped slot; and
   a shape memory material second component having a half dovetail shaped attachment feature disposed in the half dovetail shaped slot of the first component, wherein the half dovetail shaped attachment feature is a shape memory material.

2. The joint of claim 1, wherein the shape memory material second component comprises a shape memory alloy.

3. The joint of claim 2, wherein the shape memory material second component comprises a NiTi alloy.

4. The joint of claim 1, wherein the first component is selected from the group consisting of a metal and an alloy.

5. The joint of claim 4, wherein the first component comprises a Ti alloy.

6. A joint comprising:
   a first component having a half dovetail shaped slot; and
   a shape memory material second component having a half dovetail shaped attachment feature disposed in the half dovetail shaped slot of the first component, wherein the first component and the second component constitute a tab extending in a downstream direction from a downstream end of a gas turbine exhaust nozzle, the second component including an actuator to move the tab between a second non-deployed position and a first deployed position.

7. The joint of claim 6, wherein the exhaust nozzle is selected from the group consisting of a fan exhaust nozzle and a core exhaust nozzle.

8. The joint of claim 7, wherein the first component is joined to the second component at a downstream end of the tab.

9. The joint of claim 7, further comprising heating means to heat the second component such that the second component moves the first component between the second non-deployed position and the first deployed position.

10. A gas turbine engine having an exhaust nozzle, the exhaust nozzle having a plurality of tabs extending in a downstream direction from a downstream end of the exhaust nozzle, at least one tab comprising:
    a first component having a half dovetail shaped slot; and
    a shape memory material second component having a half dovetail shaped attachment feature disposed in the half dovetail shaped slot of the first component, and an actuator to move the at least one tab between a first position and a second position.

11. The joint of claim 6, wherein the shape memory material second component comprises a shape memory alloy.

12. The joint of claim 11, wherein the shape memory material second component comprises a NiTi alloy.

13. The joint of claim 6, wherein the first component is selected from the group consisting of a metal and an alloy.

14. The joint of claim 13, wherein the first component comprises a Ti alloy.

15. The joint of claim 1, wherein the joint is disposed in a gas turbine engine exhaust nozzle.

* * * * *